United States Patent [19]
Pirson et al.

[11] Patent Number: 5,629,885
[45] Date of Patent: May 13, 1997

[54] SQUARING CIRCUIT FOR BINARY NUMBERS

[75] Inventors: Alain Pirson, Seyssins; Jean-Michel Bard, Crolles; Mohamed Daoudi, Eybens, all of France

[73] Assignee: SGS-Thomson Microelectronics S.A., Saint Genis, France

[21] Appl. No.: 335,576

[22] Filed: Nov. 7, 1994

[30] Foreign Application Priority Data

Nov. 8, 1993 [FR] France ............... 93 13589

[51] Int. Cl.[6] ............... G06F 7/38
[52] U.S. Cl. ............... 364/753
[58] Field of Search ............... 364/753, 760

[56] References Cited

U.S. PATENT DOCUMENTS

| | | | |
|---|---|---|---|
| 3,610,906 | 10/1971 | Stampler | 235/164 |
| 4,817,028 | 3/1989 | Masson | 364/753 |

OTHER PUBLICATIONS

IBM Technical Disclosure Bulletin, vol. 34, No. 7B, Dec. 1991 New York, US, pp. 339–340, "Unit To Square A Number In Reduced Time And Area".

*Primary Examiner*—Tan V. Mai
*Attorney, Agent, or Firm*—David M. Driscoll; James H. Morris

[57] ABSTRACT

A circuit for squaring a binary number X of n bits, $x_0$ to $x_{n-1}$, includes pre-processing circuits to form a group of all the products $x_i y_j$ of the bits of number X, where i and j vary between 0 and n−1 such that $i \leq j$. The outputs of the pre-processing circuits provide words such that each word is formed by a succession, as complete as possible, of products selected among the products remaining from the group of products after forming the preceding word, each product $x_i y_j$ of this succession being affected with a weight i+j+1 of the word if i is different from j, or with a weight 2i if i=j. Adders are connected to sum the words as the square of the number X.

31 Claims, 7 Drawing Sheets

|   | 6 | 5 | 4 | 3 | 2 | 1 | 0 |
|---|---|---|---|---|---|---|---|
| L1 | $x_3 y_3$ | $x_2 y_3$ | $x_1 y_3$ | $x_0 y_3$ | $x_0 y_2$ | $x_0 y_1$ | $x_0 y_0$ |
| L2 |   | $x_3 y_2$ | $x_2 y_2$ | $x_1 y_2$ | $x_1 y_1$ | $x_1 y_0$ |   |
| L3 |   |   | $x_3 y_1$ | $x_2 y_1$ | $x_2 y_0$ |   |   |
| L4 |   |   |   | $x_3 y_0$ |   |   |   |
Fig 1
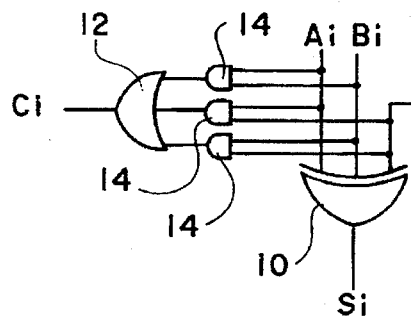
Fig 2A
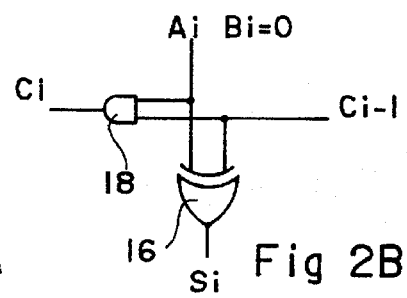
Fig 2B
|   |   |   |   |   |   |   |   |
|---|---|---|---|---|---|---|---|
| L1 | $x_3$ | $2 x_2 x_3$ | $2 x_1 x_3$ | $2 x_0 x_3$ | $2 x_0 x_2$ | $2 x_0 x_1$ | $x_0$ |
| L2 |   |   | $x_2$ | $2 x_1 x_2$ | $x_1$ |   |   |
Fig 3A
|   |   |   |   |   |   |   |   |
|---|---|---|---|---|---|---|---|
| L1 | $x_2 x_3$ | $x_1 x_3$ | $x_0 x_3$ | $x_0 x_2$ | $x_0 x_1$ | 0 | $x$ |
| L2 | $x_3$ | 0 | $x_1 x_2$ | 0 | $x_1$ |   |   |
| L3 |   |   | $x_2$ |   |   |   |   |
Fig 3B
|   |   |   |   |   |   |   |   |
|---|---|---|---|---|---|---|---|
| L1 | $x_2 x_3$ | $x_1 x_3$ | $x_0 x_3$ | $x_0 x_2$ | $x_0 x_1$ | 0 | $x_0$ |
| L2 | $x_3$ | $x_1 x_2$ | $x_1^* x_2$ | 0 | $x_1$ |   |   |
Fig 3C
|   |   |   |   |   |   |   |   |
|---|---|---|---|---|---|---|---|
| L1 | $x_2 x_3$ | $x_1 x_3$ | $x_0 x_3$ | $x_0 x_2$ | $x_0^* x_1$ | 0 | $x_0$ |
| L2 | $x_3$ | $x_1 x_2$ | $x_1^* x_2$ | $x_0 x_1$ | 0 |   |   |
Fig 3D

|   | 8 | 7 | 6 | 5 | 4 | 3 | 2 | 1 | 0 |
|---|---|---|---|---|---|---|---|---|---|
| L1 |   |   | $x_2x_3$ | $x_1x_3$ | $x_0x_3$ | $x_0x_2$ | $x_0x_1$ | 0 | $x_0$ |
| L2 |   |   | $x_3$ | 0 | $x_1x_2$ | 0 | $x_1$ |   |   |
| L3 |   |   |   |   | $x_2$ |   |   |   |   |
| L4 | $(x_3x_4)^*$ | $(x_2x_4)^*$ | $(x_1x_4)^*$ | $(x_0x_4)^*$ |   |   |   |   |   |
| L5 | $x_4$ |   |   | 1 |   |   |   |   |   |

|   |   |   |   |   |   |   |   |   |   |
|---|---|---|---|---|---|---|---|---|---|
| L1 | $x_4$ | 0 | $x_2x_3$ | $x_1x_3$ | $x_0x_3$ | $x_0x_2$ | $x_0^*x_1$ | 0 | $x_0$ |
| L2 |   |   | $x_3$ | $x_1x_2$ | $x_1^*x_2$ | $x_0x_1$ | 0 |   |   |
| L3 | $(x_3x_4)^*$ | $(x_2x_4)^*$ | $(x_1x_4)^*$ | $(x_0x_4)^*$ |   |   |   |   |   |
| L4 |   |   |   | 1 |   |   |   |   |   |

|   |   |   |   |   |   |   |   |   |   |
|---|---|---|---|---|---|---|---|---|---|
| L1 | $x_4$ | C2 | S2 | $x_1x_3$ | $x_0x_3$ | $x_0x_2$ | $x_0^*x_1$ | 0 | $x_0$ |
| L2 | $(x_3x_4)^*$ | $(x_2x_4)^*$ | $(x_1x_4)^*$ | S1 | $x_1^*x_2$ | $x_0x_1$ |   |   |   |

Fig 7A

| | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| L1 | | | $x_0x_1$ | $x_0x_2$ | $x_0x_3$ | $x_0x_4$ | $x_0x_5$ | $x_0x_6$ | $x_0x_7$ | $x_7x_1$ | $x_7x_2$ | $x_7x_3$ | $x_7x_4$ | $x_7x_5$ | $x_7x_6$ |
| L2 | $x_0$ | 0 | $x_1$ | 0 | $x_1x_2$ | $x_1x_3$ | $x_1x_4$ | $x_1x_5$ | $x_1x_6$ | $x_6x_2$ | $x_6x_3$ | $x_6x_4$ | $x_6x_5$ | 0 | $x_7$ |
| L3 | | | | | $x_2$ | 0 | $x_2x_3$ | $x_2x_4$ | $x_2x_5$ | $x_5x_3$ | $x_5x_4$ | 0 | $x_6$ | | |
| L4 | | | | | | | $x_3$ | 0 | $x_3x_4$ | 0 | $x_5$ | | | | |
| L5 | | | | | | | | | $x_4$ | | | | | | |

Fig 7B

| | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| L1 | | | $x_0^*x_1$ | $x_0(x_1\oplus x_2)$ | $S_0$ | $x_0x_4$ | $x_0x_5$ | $x_0x_6$ | $x_0x_7$ | $x_7x_1$ | $x_7x_2$ | $x_7x_3$ | $x_7x_4$ | $x_7x_5$ | $x_7x_6$ |
| L2 | $x_0$ | 0 | $x_1$ | | | $x_1x_3$ | $x_1x_4$ | $x_1x_5$ | $x_1x_6$ | $x_6x_2$ | $x_6x_3$ | $x_6x_4$ | $x_5^*x_6$ | $x_5x_6$ | $x_7$ |
| L3 | | | | | | $x_1x_2$ | $x_2x_3$ | $x_2x_4$ | $x_2x_5$ | $x_5x_3$ | $x_4^*x_5$ | $x_4x_5$ | 0 | | |
| L4 | | | | | | $x_0x_2x_3$ | $x_3$ | 0 | $x_3^*x_4$ | $x_3x_4$ | | | | | |

SQUARING CIRCUIT FOR BINARY NUMBERS

BACKGROUND OF THE INVENTION

1. Field of the Invention

The present invention relates to a squaring circuit for squaring an n-bit binary number X hereinafter referenced $[x_{n-1}, x_{n-2}, \ldots x_0]$.

2. Discussion of the Related Art

To square a binary number X, a table of squared numbers stored in a non-volatile memory (ROM) is commonly used, the number X being applied on the address lines of the ROM. To store all the squares of an n-bit number X, the size of the ROM must be of $2^n$ words of 2n bits. Such a ROM-table is particularly large in silicon area.

Furthermore, a ROM has a long access time. In present common technologies, successive words in ROM cannot be accessed at a frequency as high as approximately 50 MHz.

Another method for squaring a number X is to use a binary multiplier provided twice with the number X. The operation of a conventional specific binary multiplier, referred to as a Booth's multiplier, as described below, is advantageous in that it is fast and uses a relatively small area.

By multiplying a binary number X expressed in decimal by $x_0 2^0 + x_1 2^1 + \ldots x_i 2^i + \ldots x_{n-1} 2^{n-1}$ and a binary number Y expressed in decimal by $y_0 2^0 + y_1 2^1 + \ldots y_j 2^j + \ldots y_{n-1} 2^{n-1}$, a product XY is obtained equal in decimal to the sum of all the products $x_i y_j 2^{i+j}$, where $x_i = 0$ or 1, $y_j = 0$ or 1, and i and j vary between 0 and n−1.

The products $x_i y_j$ (equal to 0 or 1) are arranged in a table having 2n−1 columns numbered from 0 to 2n−2, from right to left, corresponding to successive weights of the binary product XY, and n lines numbered from L1 to Ln.

FIG. 1 represents such a table with exemplary four-bit numbers X and Y. In a column of weight k, all the products $x_i y_j$ such that i+j=k are successively arranged. The table is filled triangularly, as represented. The value (0 or 1) of each product $x_i y_j$ is obtained by pre-processing circuits that define a logic AND between the bit $x_i$ of number X and the bit $y_j$ of number Y. Each line Lp (p=1, 2, . . . n) corresponds to a word Lp whose bits of successive weights are constituted by the contents of the cells of line Lp, respectively. The desired binary product XY is obtained by summing the words L1 to Ln.

Hereinafter, terms such as "line" of the table and "word" are used interchangeably as are "cell", "term", and "bit" of the table.

To sum words L1 to Ln, it is common to use a first series of adders to sum the words by pairs, a second series of adders to sum the outputs of the first series of adders by pairs, and so on. In the example of FIG. 1, a first adder would sum words L1 and L2, a second adder would sum words L3 and L4, and a third adder would sum the results provided by the first and second adders. Generally, n−1 adders are required to sum the n words L.

When a Booth's multiplier is used to square a number X, a table such as the one of FIG. 1 is obtained by replacing y's with x's.

FIG. 2A represents an elementary summing cell of a conventional adder. Two bits of weight i, Ai, and Bi, of two words to sum are provided to an Exclusive OR gate 10 whose output provides the sum Si of bits Ai and Bi. Moreover, the gate 10 receives a carry bit Ci−1 generated by a preceding cell summing the bits of weight i−1 of the two words to sum. The cell provides a carry bit Ci to the next cell through an OR gate 12 receiving the outputs of three AND gates 14. A first of gates 14 receives bits Ai and Bi, a second gate receives bits Ai and Ci−1, and a third gate receives bits Bi and Ci−1.

A p-bit adder includes p−1 cells, referred to as full-adders, such as the ones of FIG. 2A, and includes, for weight 0, a simpler, so-called half-adder, described hereinafter.

Gates 12 and 14 have a specific switching time. Thus, a carry bit Ci is steady shortly after the inputs Ai, Bi and Ci−1 are steady. The same is true for the carry bit Ci−1 which has a steady value shortly after the inputs of the preceding cell are steady, and so on. It is said that the carry bit propagates from the cell of weight 0 to the cell of highest weight. The stabilization time of the output of a p-bit adder is substantially equal to the propagation time, that is, proportional to p.

If, additionally, the output of a first adder is provided to a second adder, the output of the second adder can stabilize only when the output of the first adder is steady. The stabilization time of the last adder of a set of cascaded adders increases with the number of adders.

Accordingly, to increase the speed of a circuit such as a Booth's multiplier, using cascaded adders, it is advantageous to decrease the size of the adders and the number of the cascaded adders.

The table of FIG. 1 has some properties allowing to simplify the adders to be used and to decrease their stabilization time. Indeed, a large number of cells of the table are empty (at 0). To sum the words L3 and L4, for example, a 5-bit adder is normally needed. However, the bits of weight 0 and 1 of word L3 are zero and the bits of weights 0 to 2 and 4 of word L4 are zero. In an adder summing the words L3 and L4, the outputs S0 and S1 are forced to 0 and the output S2 is directly connected to the bit of weight 2 ($x_2 y_0$) of word L3. To sum the bits of weight 3, a half-adder is used, and to sum the bits of weight 4, since one of the bits is zero, a cell similar to the half-adder is used. Thus, instead of using a 5-bit adder, an adder with only two half-adders is used.

FIG. 2B represents a half-adder. When one of the bits of the numbers to be summed is zero, or when the cell is the first one (receiving no carry bit), the cell structure is simplified. When one of the bits, for example Bi, is zero the cell includes an Exclusive OR gate 16 receiving the non-zero bit Ai and carry bit Ci−1 provided by the preceding cell. An AND gate 18 receiving the bits Ai and Ci−1 provides the carry bit Ci to the next cell. The first cell of an adder has the same structure except that i=0, and bit B0 is provided to gate 16 instead of carry bit Ci−1. The structure of FIG. 2B is simpler and faster than the one of FIG. 2A. It is therefore advisable to use this structure whenever possible.

SUMMARY OF THE INVENTION

An object of the present invention is to provide a particularly fast squaring circuit based on the Booth's method.

A further object of the present invention is to provide such a squaring circuit occupying a particularly small area.

To achieve these objects, the present invention provides a squaring circuit for squaring an n-bit binary number X, $x_0$ to $x_{n-1}$. The squaring circuit includes pre-processing circuits to form the set of products $x_i y_j$ of the bits of number X, where i and j vary between 0 and n−1 such that i≦j. The outputs of the pre-processing circuits provide words such that each word is formed by a succession, as full as possible, of products selected among the products remaining from the set of products after the formation of the preceding word. Each product $x_iy_j$ of this succession is classified at a weight $i+j+1$ of the word if i is different from j, or at a weight $2i$ if $i=j$. Adders are connected to sum the words as the square of the number X.

According to an embodiment of the invention, the pre-processing circuits include means for forming the sum of the products normally corresponding to two bits of two words having the same weight. This sum is provided to one of the two bits, and the other bit is forced to zero, the carry bit of the sum is propagated to a normally zero bit of one of the words.

According to an embodiment of the present invention, the pre-processing circuits directly form from the bits of the number X the values of the bits to be modified by the sum and the propagation of the carry bit.

According to an embodiment of the present invention, the adders include carry-save cascaded adders.

According to an embodiment of the present invention, the circuit squares a signed number X' of n+1 bits $x_0$-$x_n$. For this purpose, the pre-processing circuits add to the set, to form the words, the following terms: 1 classified at weight n+1 of a word, $x_n$ classified at weight 2n of a word, and the complements of products $x_ix_n$, where i varies from 0 to n−1, respectively classified at weights i+n+1 of a word.

The foregoing and other objects, features, aspects and advantages of the invention will become apparent from the following detailed description of the present invention when taken in conjunction with the accompanying drawings.

BRIEF DESCRIPTION OF DRAWINGS

FIG. 1, above described, illustrates a conventional method for multiplying two binary numbers;

FIGS. 2A and 2B, above described, represent elementary cells of an adder;

FIG. 3A–3D illustrate exemplary optimization steps of a squaring circuit of positive numbers according to the invention;

FIGS. 7A and 7B illustrate, in another example, an initial step and a final step of an optimization of a squaring circuit of positive numbers according to the invention;

FIGS. 9A and 9B illustrate, in another example, an initial step and a final step of an optimization of a squaring circuit of signed numbers according to the invention.

DETAILED DESCRIPTION

Figure 4A:
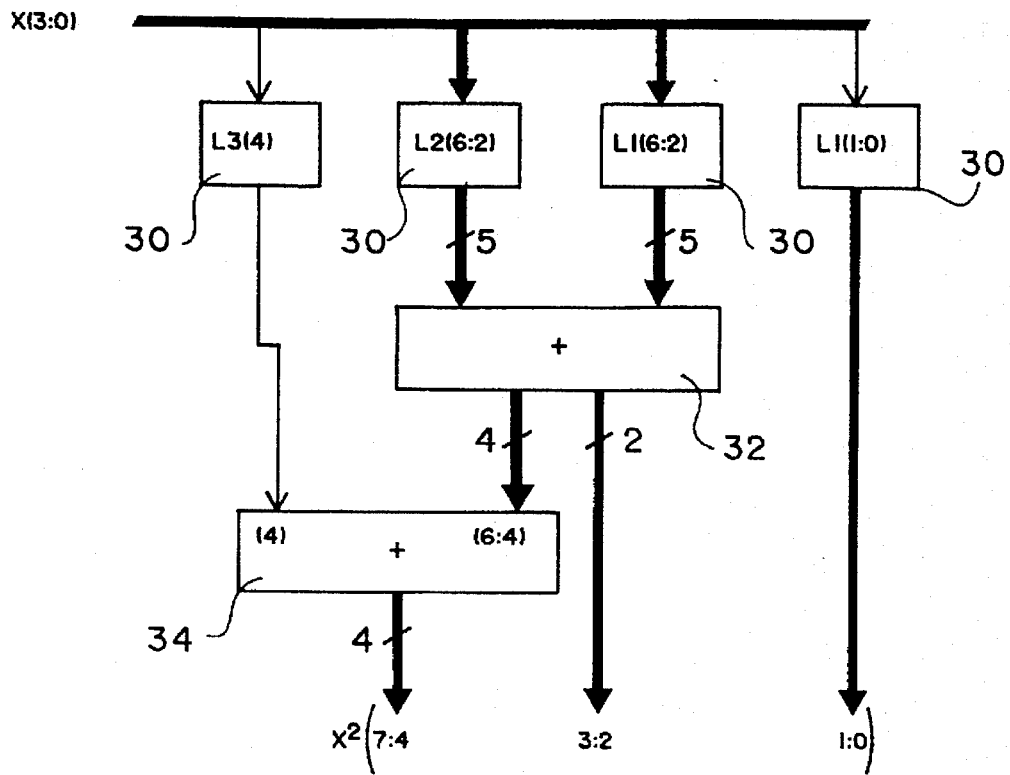
FIGS. 4A and 4B represent two embodiments of the squaring circuit according to the invention, that are realized from the tables of FIG. 3B and 3D, respectively.

FIG. 3A corresponds to the table of FIG. 1 when squaring a number X, all the pairs of equal products being grouped. In each column, each pair of products $x_ix_j$, $x_jx_i$ is replaced by product $2x_ix_j$. The products $x_ix_i$ (0 by 0 or 1 by 1) are equal to $x_i$, as apparent in the tables. The multiplication by 2 of a product $x_ix_j$ amounts to shifting this product of one column to the left.

FIG. 3B represents the result of these left-shifts. A table of n/2+1 lines (3 in the present example) if n is even, and (n+1)/2 lines if n is odd is obtained. Each product $x_ix_j$, such that i<j (or j<i), is arranged in the column of weight i+j+1 and each term $x_k$ (corresponding to a product $x_kx_k$) is arranged in the column of weight 2k.

The sum of words L corresponding to the lines of the table constitutes the desired squared number $X^2$.

An initial step of the invention is to reorder the words to be summed so as to obtain n/2+1 words, if n is even, or (n+1)/2 words if n is odd, instead of n words that are obtained by directly applying Booth's method. In addition, it should be appreciated that the words to add have a large number of bits at 0 (corresponding to empty or zero cells). Thus, apart from the fact that the number of adders is reduced, adders including fewer full-adders can be used. Accordingly, each adder is faster and smaller.

An aspect of the invention is to cancel additional cells of the table, especially the outermost cells of the lines and even full lines.

FIG. 3C illustrates an optimization step of the table of FIG. 3B according to this aspect of the invention. In the above table 3B, a dotted frame represents the elements that are modified to carry out this optimization. To obtain the table of FIG. 3C, the term $x_1x_2$ of line L2, column 4, is replaced with the sum of this term and the term $x_2$ of line L3, column 4, which provides the term $x_1*x_2$ at line L2, column 4. The symbol * indicates that the number which precedes it is complemented. Of course, the sum of terms $x_1x_2$ and $x_2$ provides a carry bit $x_1x_2$. The carry bit is inserted into an empty cell at line L2, column 5.

According to another aspect of the invention, a sum (for example $x_1*x_2$ in column 4) and a carry bit (for example $x_1x_2$ in column 5) are not obtained by an adder which sums the values of the corresponding cells ($x_1x_2$ and $x_2$), but directly from bits ($x_1$ and $x_2$) of number X by logic gates. This reduces the number of logic gates connected in series and therefore increases the response speed of the circuit.

The step of FIG. 3C allows to eliminate a line of the table. To obtain the square $X^2$, the two words corresponding to the two lines of the table are merely summed. The use of an adder is spared regarding a circuit realized from the table of FIG. 3B.

FIG. 3D represents an optimization step of the table of FIG. 3C. The modified elements in the table of FIG. 3C are surrounded by a dotted frame. The term $x_0x_1$ at line L1, column 2, is replaced with the sum of itself and the term $x_1$ at line L2, column 2. Term $x_0*x_1$ is obtained at line L1, column 2, and the carry bit, $x_0x_1$, is inserted at line L2, column 3 where it fills an empty cell. As above, the sum and the carry bits are directly obtained from the bits $x_0$ and $x_1$ of number X.

This optimization lets an additional empty cell appear at the right of line L2 (of word L2). Thus, to sum words L1 and L2, a 4-bit adder is needed instead of a 5-bit adder in the case of FIG. 3C. The bits of weights 3 to 6 of words L1 and L2 are provided to the adder and the bits of weights 0 to 2 of word L1 directly constitute the bits of weights 0 to 2 of number $X^2$. Accordingly, this optimization allows to decrease the size and, thereby, the response time of the circuit.

FIG. 4A represents a squaring circuit realized from the table of FIG. 3B. This circuit includes pre-processing circuits 30 receiving the bits of number X to be squared. These pre-processing circuits provide all the non-zero terms ($x_i x_j$, $x_k$) of the table of FIG. 3B; they are directly obtained by AND gates from bits x of number X. A 5-bit adder 32 sums the bits of weights 2 to 6 of words L1 and L2. The bits of weights 0 and 1 of word L1 are directly provided as bits of weights 0 and 1 of the squared number $X^2$. A 4-bit adder 34 sums the word L3 of the four most significant output bits of adder 32, the two outputs of least significance being directly provided as bits of weights 2 and 3 of the square number $X^2$. Since all the bits, except one bit of word L3, are zero, the adder 34 includes only half-adders.

Figure 4B:
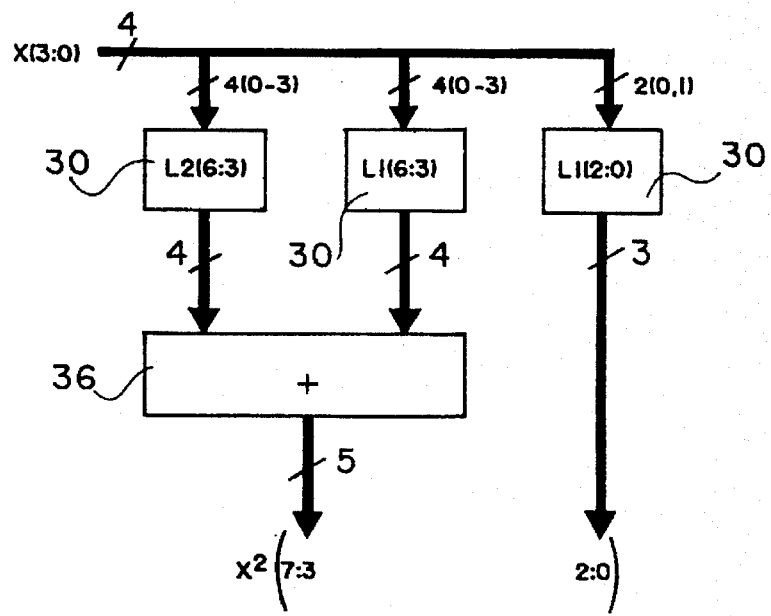

FIG. 4B represents an embodiment of a squaring circuit according to the invention provided by the optimization step of FIG. 3D. The squaring circuit also includes pre-processing circuits 30 receiving the bits of number X and providing all the non-zero terms of the table of FIG. 3D. These terms are directly obtained from bits x of the number X through suitable combinations of logic gates that those skilled in the art will be able to find from the table (for example, the term $x_0 * x_1$ is obtained by an AND gate receiving the bit $x_1$ and the complement of bit $x_0$). The bits of weights 0 to 2 of word L1 are provided as bits of weights 0 to 2 of number $X^2$, and the bits of weights 3 to 6 of words L1 and L2 are added by adder 36 to provide the five remaining bits of weights 3 to 7 of number $X^2$. With this embodiment, one fewer adder is required compared with the embodiment of FIG. 4A.

In the above description, it is assumed that number X is positive. However the present invention also applies to signed binary numbers X' of n+1 bits [$x_n$, $x_{n-1}$, ... $x_0$], whose bit $x_n$ is a sign bit. A signed number X' is expressed in decimal by the sum of products $x_i 2^i$ (i ranging from 0 to n−1) and of term $-x_n 2^n$. When this number is squared, the sum of the following terms expressed in decimal are obtained:

$X^2$, the square expressed in decimal of the positive binary number X=[$x_{n-1}$, $x_{n-2}$, ... $x_0$];

the sum of terms $-x_i x_n 2^{i+n+1}$ where i ranges from 0 to n−1; and the term $x_n 2^{2n}$.

If the conventional rule of the "2's complement" is applied to express signed binary numbers, where the complement of a binary number is equal to its complement plus 1, the squared number $X'^2$ is expressed, in decimal, by the sum of the terms $X^2$, $x_n 2^{2n}$, $2^{n+1}$ and of the products $(x_i x_n) * 2^{i+n+1}$ where i ranges from 0 to n−1.

Figures 5A, 5B, 5C, 6:
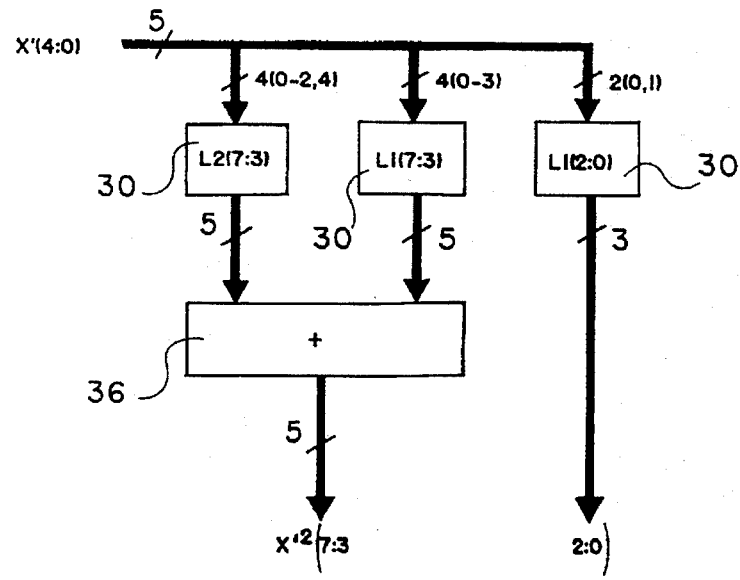
FIGS. 5A–5C illustrate exemplary optimization steps of a squaring circuit of signed numbers according to the invention.
FIG. 6 represents an embodiment of a squaring circuit realized from the table of FIG. 5C.

FIG. 5A represents a table grouping these terms, in an example where the signed number X' has 5 bits (4 bits are plus a sign bit). The terms of number $X^2$ are arranged in the same manner as in the table of FIG. 3B in columns 0 to 6. Moreover, in two additional lines (L4 and L5), the terms $(x_i x_n)*$, where i varies between 0 and n−1, are arranged in the respective columns i+n+1. The term 1 is in the column n+1 (5), and the term $x_n$ ($x_4$) is in the column 2n (8). As above, the desired square $X'^2$ is obtained by summing the lines of the table. The arrangement of FIG. 5A is not optimal but is more advantageous than an arrangement directly obtained from Booth's method.

FIG. 5B represents an optimization step of the table of FIG. 5A. The terms corresponding to the number $X^2$ are optimized according to the above description with reference to FIG. 3D. The term $x_4$ of column 8 is inserted into the first line of column 8. So, n/2+2 lines are added (if n is even) whereas, with Booth's method, at least n+1 lines would be added.

FIG. 5C is a table illustrating an additional optimization step according to the invention. In the table of FIG. 5B, the terms affected by this optimization are surrounded with a dotted frame. The term $x_1 x_2$ of line L2, column 5, is replaced with the sum of the terms of column 5, lines L2 to L4 ($x_1 x_2$, $(x_0 x_4)*$, 1). This sum is referenced S1 in the table of FIG. 5C and is expressed by:

$$S1 = x_0 x_4 \text{ XOR } x_1 x_2,$$

where XOR designates the logic Exclusive OR operator. The carry bit of this sum is inserted into column 6. This carry bit is added to the terms ($x_2 x_3$, $x_3$) of lines L1 and L2, column 6 to form a sum S2 replacing the term $x_2 x_3$ of line L1, column 6. The sum S2 is expressed by:

$$S2 = x_2 * x_3 \text{ XOR } x_1 x_2 \text{ OR } (x_0 x_4)*.$$

The carry bit C2 of sum S2 is inserted in the empty cell of line L1, column 7. The carry bit C2 is expressed by:

$$C2 = x_3(x_2 \text{ OR } (x_0 x_4)*).$$

The carry bit of the sum of the terms of column 5 has been propagated to an empty cell of a column (7) of higher weight.

Thus, the cells of weights 6 to 8 of line L2 are freed and respectively receive the remaining terms $(x_1 x_4)*$, $(x_2 x_4)*$, and $(x_3 x_4)*$ of line L3. Thereby, the table is reduced by two lines.

FIG. 6 represents an embodiment of a squaring circuit according to the invention provided by the optimization of FIG. 5C. This circuit differs from the one of FIG. 4B in that the pre-processing circuits 30 provide the values of the table of FIG. 5C and in that the adder 36 is a 5-bit adder summing the terms of columns 3 to 7 of FIG. 5C. The terms of column 8 are ignored because they correspond to the sign bit, which is always zero since a square number is positive. Additionally, the 5-bit adder 36 should normally provide the sum on 5 bits plus one carry bit. In FIG. 6, the carry bit of adder 36, which would constitute a ninth bit of the square number $X^2$, is ignored.

A binary number X' having n bits and a sign bit can have decimal values between $-2^n$ and $2^n-1$. In many cases, for example if number X' corresponds to the difference between two positive binary numbers of n bits, number X' has decimal values only between $-(2^n-1)$ and $2^n-1$; in this case, the square of X' is expressed with 2n bits. In contrast, if number X' can have the value $-2^n$, the square of this number is expressed with 2n+1 bits; the column of weight 2n is then taken into account.

FIGS. 7A and 7B are tables corresponding to the optimization steps of FIGS. 3A and 3D with an exemplary positive number of n=8 bits.

In FIG. 7A, the terms are distributed in accordance with the general rule described with reference to FIG. 3B. The table includes 5 lines, instead of 8 which would be obtained by applying Booth's method.

In FIG. 7B, the number of lines is reduced to 4 according to the method described with reference to FIG. 3C. Also, the rightmost terms are cancelled up to column 4 of lines 2 and 3, in the way described with reference to FIG. 3D. The term $x_0 x_1$ of line L1, column 2, is replaced with the sum of itself and the term $x_1$ of line L2, column 2. The term $x_0 x_2$ of line L1, column 3, is replaced with the sum of itself and the carry bit of the sum carried out in column 2. In column 3, the surrounded + corresponds to the Exclusive OR operation. The term $x_0x_3$ of line L1, column 4, is replaced with the sum of the terms of lines L1 to L3 of column 4 and the carry bit of the sum carried out in column 3. This sum S0 is expressed by:

$$S0 = x_0x_3 \text{ XOR } x_2(x_0 \text{ OR } x_1^*).$$

Since the sum S0 corresponds to the sum of four terms, a double carry bit is generated. One carry bit, $x_1x_2$, is inserted at line L3, column 5, and the other carry bit, $x_0x_2x_3$, is inserted at line L4, column 5, in two respective empty cells.

Of course, as indicated above, the sums inserted into cells of the table are not obtained by adders, but directly by logic circuits, from bits of number X. Thus, for example, the term $x_0x_2x_3$ of line L4, column 5, is obtained by a three-input AND gate receiving the bits $x_0$, $x_2$, and $x_3$, respectively.

In the table of FIG. 7B, the term of line L4, column 10 is also cancelled by adding it to the term of the preceding line and inserting the carry bit in column 11. Also, the term of line L3, column 12, is cancelled by adding it to the term of the preceding line and inserting the carry bit in the empty cell of line L2, column 13.

By cancelling cells at both ends of the lines, the structure of the adders that will add these lines is simplified. Especially, by cancelling cells at the rightmost end of the lines, the number of bits of the adders decreases. A particularly advantageous optimization is obtained by cancelling as many terms as possible at the right and left ends of the lines of the table. Those skilled in the art will be able to cancel these terms in many ways. The cancelling of terms illustrated in the table are shown by way of example only. Indeed, the terms of each column can be shuffled and each shuffle provides a distinct sum of terms to cancel a cell of the table.

Figure 8:
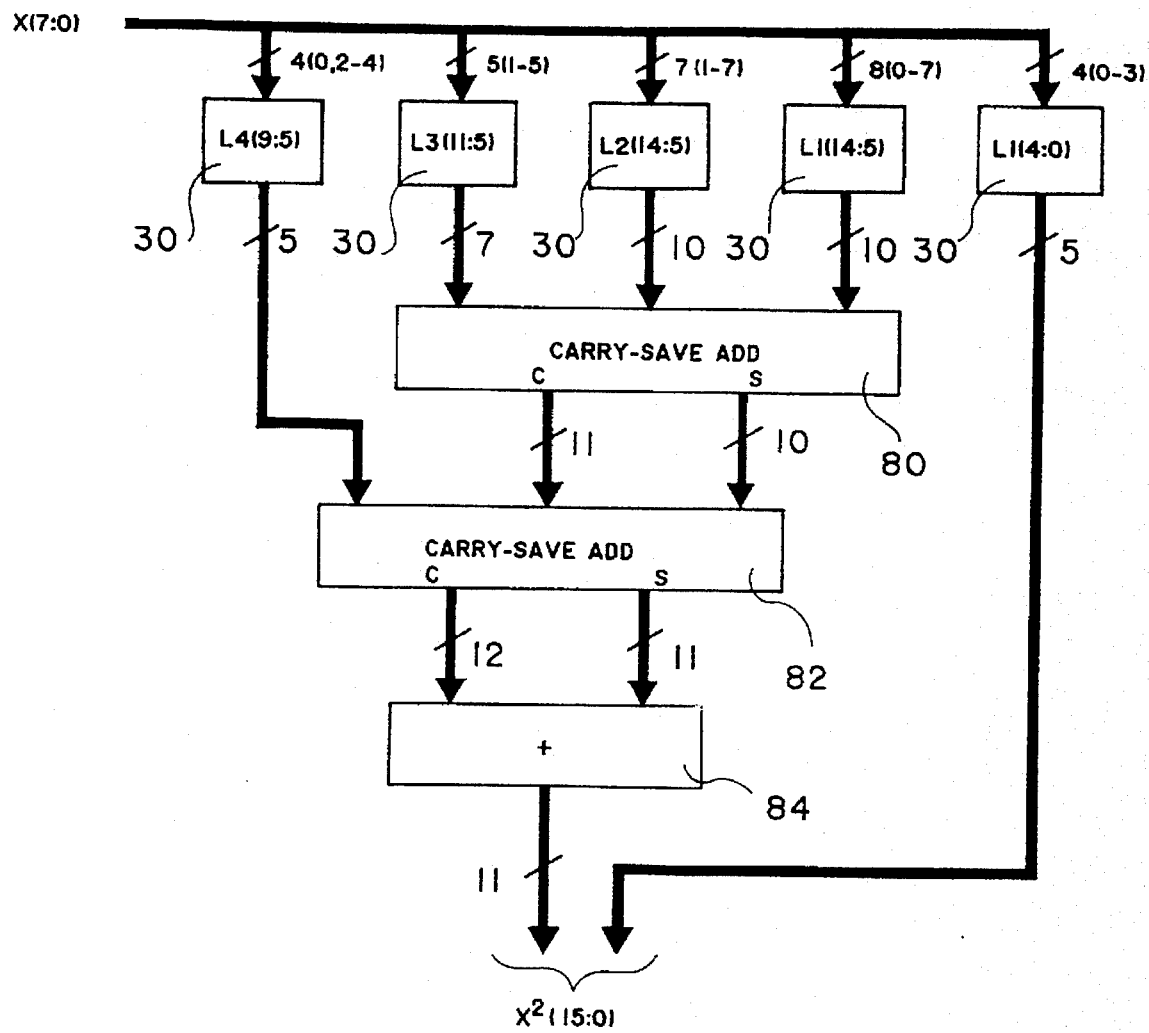
FIG. 8 represents an advantageous embodiment of the squaring circuit realized from the table of FIG. 7B.

FIG. 8 represents a particularly advantageous embodiment of a squaring circuit according to the invention obtained by the optimization of the table of FIG. 7B. The terms of weights 0 to 4 of the first line of the table of FIG. 7B are directly provided as the bits of weights 0 to 4 of the square number to provide.

According to a particularly advantageous embodiment of the invention, carry-save adders are used to carry out the sums. A carry-save adder is an adder including three inputs and two outputs. The three inputs receive three binary numbers to be added. An elementary cell of such an adder is identical to the cell of a conventional adder, as represented in FIG. 2A, except that the input $C_{i-1}$ of the cell receives the bit of weight i of the third number to be added and that the output $C_i$ of the OR gate 12 is not connected to the next cell. The outputs $S_i$ of the Exclusive OR gate 10 constitute a first output S of the carry-save adder, and the outputs $C_i$ of the OR gates 12 constitute the second output C of the carry-save adder. Furthermore, the weights of the outputs C are increased by 1. The advantage of such an adder is that there is no stabilization delay caused by the propagation of the carry bits. The response time of the adder is approximately equal to the switching time of the Exclusive OR gate 10.

One of the carry-save adders, 80, receives the bits of weights 5 to 14 of words L1 to L3. Since the three bits of weights 12 to 14 of word L3 are zero, the corresponding elementary cells of adder 80, which merely have to sum two bits each, have a simple structure such as the one of FIG. 2B.

A second carry-save adder 82 receives the two outputs of adder 80 and the bits of weights 5 to 9 of word L4. Since the bits of weights 10 to 14 of word L4 are zero, the corresponding cells of adder 82 have a simple configuration, such as the one of FIG. 2B.

Finally, a normal adder 84 (without a carry-save function) adds the outputs of adder 82 and provides the bits of weights 5 to 15 of the square number $X^2$.

The adder 80 is a 10-bit adder. Its output S is provided on 10 bits, and its output C is provided on 11 bits. Accordingly, the adder 82 is an 11-bit adder and normally provides an output S on 11 bits and an output C on 13 bits. Only 11 bits out of these 13 bits are used, the remaining bits being at 0. In practice, in the example of FIG. 7B, the last three bits of the output C of adder 82 are always zero. This allows to simplify the adders 82 and 84 by using, for the zero bits, half-adders in adder 84, and to eliminate the gates 12 and 14 of the corresponding cells of the adder 82.

Figures 9A, 9B:
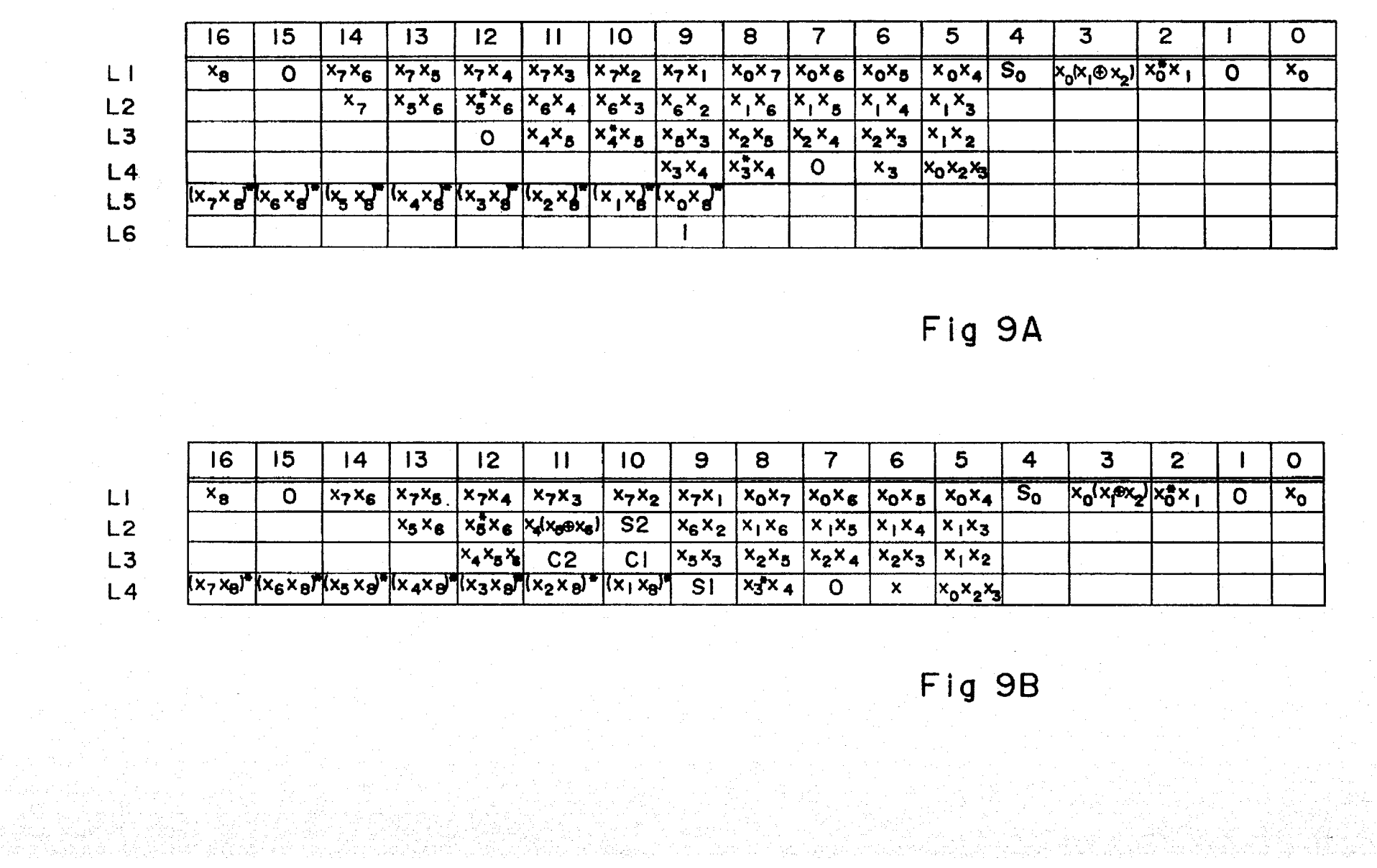

FIG. 9A represents a table, corresponding to the table of FIG. 5B, for a number X' having n=8 bits $x_0$ to $x_7$ and a sign bit $x_8$. This table is filled in accordance with the general rules, mentioned above with reference to FIGS. 5A and 5B.

FIG. 9B represents an optimization of the table of FIG. 9A in accordance with the description relating to FIG. 5C. By summations that will not be described in detail, terms have been cancelled in the lines in order to raise the lines 5 and 6 of FIG. 9A. The new values of the terms, provided by the sums of terms of same columns and propagating the carry bits, are written in the cells. The sum S1 in line L4, column 9, is expressed by $x_3x_4$ XOR $x_0x_8$. The carry bit C1 of this sum, in line L3, column 10, is expressed by $x_3x_4$ OR $(x_0x_8)^*$. The sum S2 in line L2, column 10, is expressed by $x_4^*x_5$ XOR $x_6x_3$ and the carry bit C2 of this sum, in line L3, column 11, is expressed by $x_4^*x_5x_6x_3$.

Figure 10:
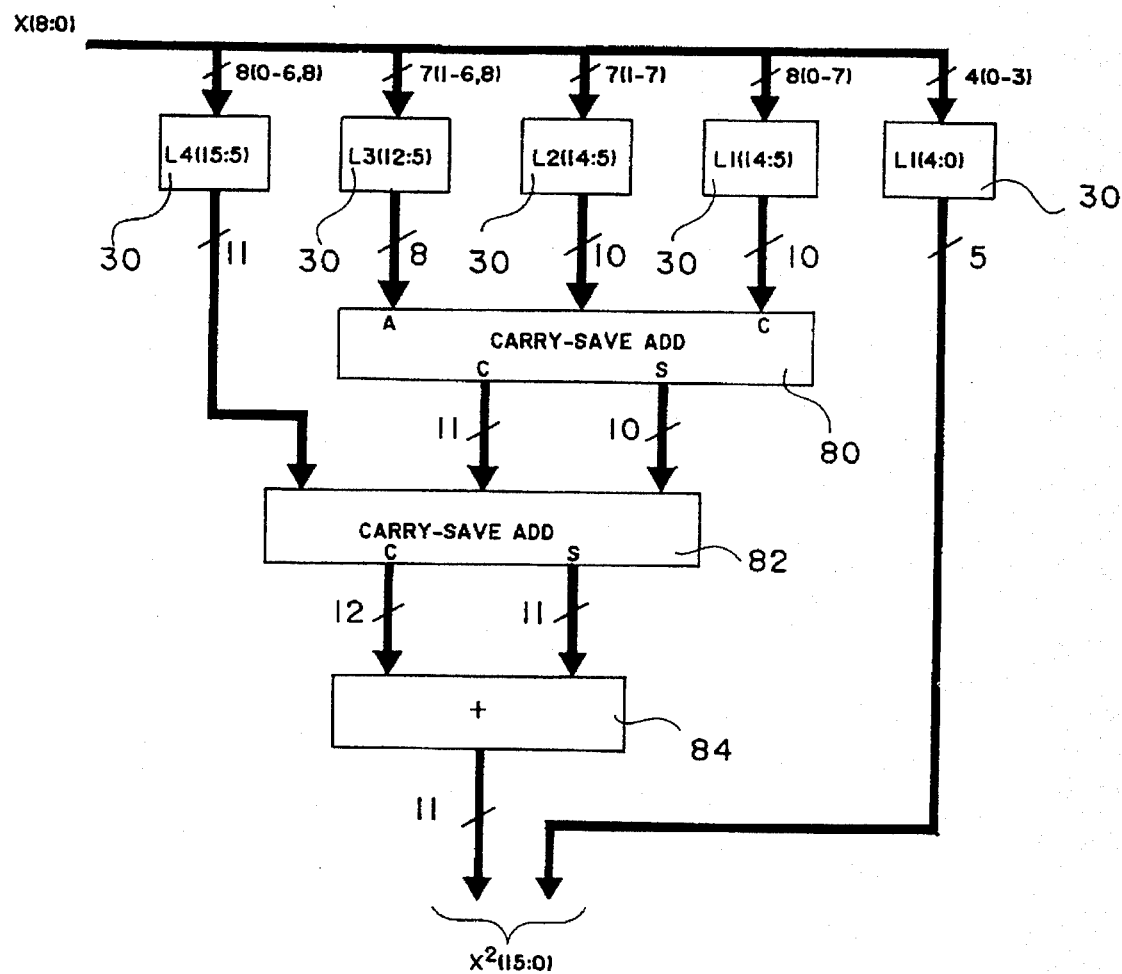
FIG. 10 represents an advantageous embodiment of the squaring circuit realized from the table of FIG. 9B.

FIG. 10 represents an embodiment of a squaring circuit according to the invention obtained by the optimization of FIG. 9B. This circuit is similar to the circuit of FIG. 8 except for the fact that the adder 80 is provided with an additional bit, of weight 12, of word L3, and that the adder 82 is provided with six additional bits, of weights 10 to 15, of word L4. Of course, the pre-processing circuits 30 of the squaring circuit are different from those of FIG. 8 since the logic functions they must provide, indicated in the table of FIG. 9B, are distinct functions.

The present invention has been described by using specific examples for simplifying the tables. Of course, many other possibilities will appear to those skilled in the art, by suitably shuffling the terms of the columns and by cancelling specific terms.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended to be limiting. The invention is limited only as defined in the following claims and the equivalents thereto.

What is claimed is:

1. A squaring circuit for squaring a binary number X of n bits, the bits having values $x_0$ to $x_{n-1}$, the squaring circuit comprising:

a plurality of pre-processing circuits constructed to form a plurality of products $x_ix_j$ of the bits of number X, wherein i and j range between 0 and n−1 such that i≦j, each product $x_ix_j$ being affected with one of a weight i+j+1, if i is different from j, and a weight 2i if i=j, wherein said products are provided in a plurality of groups, each group representing a digital word; and at least one adder connected to form the sum of the digital words as a square of the number X;

wherein the pre-processing circuits include means for forming a sum of two products that differ from each other, each of the two products corresponding to a bit, having a same weight, in one of two digital words, said sum replacing one of the two products in its corresponding one of the two digital words, a carry bit of said sum being provided as a higher order bit of one of the digital words, so as to reduce at least one of a number of digital words that are added to form the square of the number X and a length of one of the two digital words.

2. The squaring circuit of claim 1, wherein the means, within the pre-processing circuits, for forming said sum and carry bit includes combinatorial logic to directly form said sum and carry bit.

3. The squaring circuit of claim 1, wherein the at least one adder includes at least one cascaded carry-save adder.

4. The squaring circuit of claim 1, wherein the other product of the same weight of the two digital words is forced to zero when the one of the two products is replaced by said sum.

5. The squaring circuit of claim 1, wherein the pre-processing circuits further include means for forming a second sum of two products that are similar to each other, a first product corresponding a first bit of a first digital word and having a first weight, and a second product, similar to the first product, corresponding to a second bit having the first weight of a second digital word, said second sum replacing the first and second bits of the first and second digital words, and a carry bit of said second sum being provided as a higher order bit of one of the digital words to reduce at least one of the number of digital words that are added to form the square of the number X and the length of one of the first and second digital words.

6. A squaring circuit for squaring a binary number X of n bits, the bits having values $x_0$ to $x_{n-1}$, the squaring circuit comprising:

a plurality of pre-processing circuits constructed to form a plurality of products $x_i x_j$ of the bits of number X, wherein i and j range between 0 and n−1 such that i≦j, each product $x_i x_j$ being affected with one of a weight i+j+1, if i is different from j, and a weight 2i if i=j, wherein said products are provided in a plurality of groups, each group representing a digital word; and at least one adder connected to form the sum of the digital words as a square of the number X;

wherein the pre-processing circuits include means for forming a sum of two products having a same weight, said sum being provided as one bit of a digital word, a carry bit being provided as a higher order bit of the digital word, so as to reduce a number of digital words that are added to form the square of the number X;

wherein the number X is a signed binary number, the n bits including m bits and one sign bit;

wherein said pre-processing circuits include means for generating 1 word having a weight m+1;

$x_m$ words having a weight m; and words including the complements of products $x_i y_m$, where i ranges from 0 to m−1, each complement of a product being arranged at a weight i+m+1.

7. The squaring circuit of claim 6, wherein m=8, and wherein the digital words generated by the pre-processing circuits to be added include:

a first digital word of 15 successive bits $x_0$, 0, $x_0 * x_1$, $x_0(x_1$ XOR $x_2)$, $x_0 x_3$ XOR $x_2$ ($x_0$ OR $x_1*$), $x_0 x_4$, $x_0 x_5$, $x_0 x_6$, $x_0 x_7$, $x_1 x_7$, $x_2 x_7$, $x_3 x_7$, $x_4 x_7$, $x_5 x_7$, $x_6 x_7$;

a second digital word of 14 successive bits 0, 0, 0, 0, 0, $x_1 x_3$, $x_1 x_4$, $x_1 x_5$, $x_1 x_6$, $x_2 x_6$, $x_4 * x_5$ XOR $x_6 x_3$, $x_4 (x_5$ XOR $x_6)$, $x_5 * x_6$, $x_5 x_6$;

a third digital word of 13 successive bits 0, 0, 0, 0, 0, $x_1 x_2$, $x_2 x_3$, $x_2 x_4$, $x_2 x_5$, $x_3 x_5$, $x_3 x_4$ OR ($x_0 x_8 *$, $x_4 * x_5 x_6 x_3$, $x_4 x_5 x_6$); and a fourth digital word of 16 successive bits 0, 0, 0, 0, 0, $x_0 x_2 x_3$, $x_3$, 0, $x_3 * x_4$, $x_3 x_4$ XOR $x_0 x_8$, $(x_1 x_8)*$, $(x_2 x_8)*$, $(x_3 x_8)*$, $(x_4 x_8)*$, $(x_5 x_8)*$, $(x_6 x_8)*$.

8. A squaring circuit for squaring a binary number X of n bits, the bits having values $x_0$ to $x_{n-1}$, the squaring circuit comprising:

a plurality of pre-processing circuits constructed to form a plurality of products $x_i x_j$ of the bits of number X, wherein i and j range between 0 and n−1 such that i≦j, each product $x_i x_j$ being affected with one of a weight i+j+1, if i is different from j, and a weight 2i if i=j, wherein said products are provided in a plurality of groups, each group representing a digital word; and at least one adder connected to form the sum of the digital words as a square of the number X, wherein the at least one adder includes at least one cascaded carry-save adder;

wherein the pre-processing circuits include means for forming a sum of two products having a same weight, said sum being provided as one bit of a digital word, a carry bit being provided as a higher order bit of the digital word, so as to reduce a number of digital words that are added to form the square of the number X;

wherein the number X is a signed binary number, the n bits including m bits and one sign bit;

wherein said pre-processing circuits include means for generating 1 word having a weight m+1;

$x_m$ words having a weight m; and words including the complements of products $x_i y_m$, where i ranges from 0 to m−1, each complement of a product being arranged at a weight i+m+1.

9. A method for generating a square of a binary number X, the number X being represented as a sequence of binary signals, the method comprising the steps of:

A) generating a plurality of product signals each representing a product of bits of the number X and each being weighted by one of a plurality of orders, wherein an order is indicative of a power of two;

B) generating at least one combination signal, the at least one combination signal being equal to a sum of at least two product signals that differ from each other, each of the at least two product signals having one of the plurality of orders;

C) grouping the product signals and the at least one combination signal in groups of one order each; and D) adding the product signals and the at least one combination signal to generate a binary signal indicative of $X^2$.

10. The method of claim 9, wherein the number X includes bits $x_{n-1}$ to $x_0$ and wherein the step A of generating product signals generates signals equal to $x_i x_j$, wherein i is not greater than j.

11. The method of claim 10, wherein the step of generating the product signals includes combining bits $x_i x_j$ using an AND-gate.

12. The method of claim 11, wherein the step of generating the combination signals includes applying product signals to an Exclusive-OR gate.

13. The method of claim 9 wherein the step B of generating further generates a carry signal for each combination signal, and wherein the step C of grouping groups the carry signal at an order one greater than an order of the combination signal.

14. The method of claim 9, wherein the step of generating combination signals reduces a number of product signals and combination signals to be added in a group in the step D of adding.

15. The method of claim 14, wherein the step of generating the combination signals simplifies an addition in the step D of adding.

16. The method of claim 9, wherein the step of adding includes applying a plurality of product signals and combination signals to at least one carry-save adder.

17. A method for generating a square of a binary number X, the number X being represented as a sequence of binary signals, comprising the steps of:
   A) generating a plurality of product signals each representing a product of bits of the number X and each being weighted by one of a plurality of orders, wherein an order is indicative of a power of two;
   B) generating at least one combination signal, the combination signal being equal to a sum of product signals and having one of the plurality of orders;
   C) grouping the product signals and at least one combination signal in groups of one order each; and
   D) adding the product signals and at least one combination signal to generate a binary signal indicative of $X^2$;
   wherein the number X is a 2's compliment binary number, and wherein the step A of generating product signals includes generating a plurality of complimented product signals.

18. The method of claim 17 wherein the step D of adding includes applying a plurality of product signals and combination signals to a carry-save adder.

19. A circuit for calculating a square of a binary number X having a plurality of bits, the circuit comprising:
   a plurality of pre-processing circuits for combining the bits of the number X in accordance with a predetermined standard to generate a plurality of combination signals, the combination signals including a plurality of products of bits of the number X and at least one sum of products of bits of the number X that differ from each other; and
   at least one adder circuit for adding at least two of the combination signals to generate a binary signal indicative of the square of X.

20. The circuit of claim 19, wherein the preprocessing circuits include a plurality of AND-gates for generating the plurality of products of bins of the number X.

21. The circuit of claim 20, wherein the preprocessing circuits further include at least one XOR gate for generating the at least one sum of products of bits of the number X.

22. The circuit of claim 19, wherein the at least one adder circuit is a carry-save adder circuit.

23. The circuit of claim 19, wherein one of the at least one adder circuits is a half-adder circuit.

24. A circuit for calculating a square of a binary number, X, having a plurality of bits, the circuit comprising:
   a plurality of pre-processing circuits for combining the bits of the number X in accordance with a predetermined standard to generate a plurality of combination signals, the combination signals including a plurality of products of bits of the number X and at least one sum of products of bits of the number X; and
   at least one adder circuit for adding at least two of the combination signals to generate a binary signal indicative of the square of X;
   wherein the number X is a signed, 2's compliment binary number, and wherein the pre-processing circuits further include inverting circuits for generating inverted combination signals.

25. A circuit for generating a square of a binary number X, wherein X includes a plurality of bits, the circuit comprising:
   means for generating a plurality of combination signals from the bits of the number X;
   means for grouping the combination signals in accordance with a predetermined standard; and
   means for adding the grouped combination signals to generate the value $X^2$;
   wherein the combination signals include a plurality of products of the bits of the number X and at least one sum of products of bits of the number X that differ from each other.

26. The circuit of claim 25, wherein the means for generating includes means for applying the bits of the number X to combinatorial logic.

27. The circuit of claim 26, wherein the combinatorial logic includes a plurality AND-gates and at least one XOR gate.

28. The circuit of claim 25, wherein the means for adding includes applying the grouped combination signals to at least carry-save adder circuit.

29. A circuit for generating a square of a binary number X, wherein X includes a plurality of bits, the circuit comprising:
   means for generating a plurality of combination signals from the bits of the number X;
   means for grouping the combination signals in accordance with a predetermined standard; and
   means for adding the grouped combination signals to generate the value $X^2$;
   wherein the combination signals include a plurality of products of the bits of the number X and at least one sum of products of the bits of the number X;
   wherein the number X is a signed 2's compliment binary number, and wherein the means for generating includes means for generating inverted combination signals.

30. A squaring circuit for squaring a binary number X of n bits, the bits having values $x_0$ to $x_{n-1}$, the squaring circuit comprising:
   a plurality of pre-processing circuits constructed to form a plurality of products $x_i x_j$ of the bits of number X, wherein i and j range between 0 and n−1 such that $i \leq j$, each product $x_i x_j$ being affected with one of a weight i+j+1, if i is different from j, and a weight 2i if i=j, wherein said products are provided in a plurality of groups, each group representing a digital word; and
   at least one adder connected to form the sum of the digital words as a square of the number X;
   wherein the pre-processing circuits include means for forming a sum of three products that each correspond to a respective bit in one of three digital words, the three products having a same weight in the three digital words, said sum replacing one of the three products in its corresponding one of the three digital words, a carry bit of said sum being provided as a higher order bit of one of the digital words to reduce at least one of a number of digital words that are added to form the square of the number X and a length of one of the three digital words.

31. The squaring circuit of claim 30, wherein other products of the same weight of the three digital words are forced to zero when the one of the three products is replaced by said sum.

* * * * *